Dec. 11, 1951  W. V. BAUER  2,577,729
CARBON BISULFIDE RETORT
Filed May 31, 1950
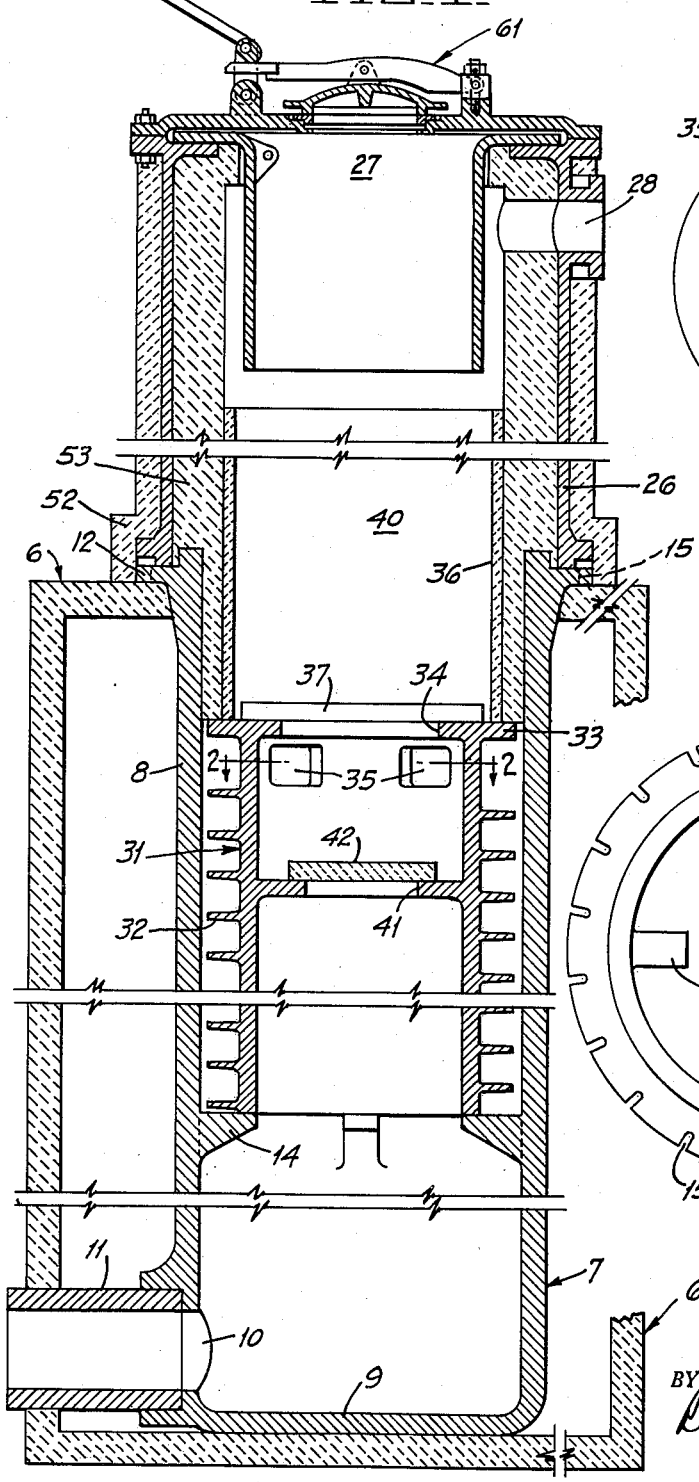
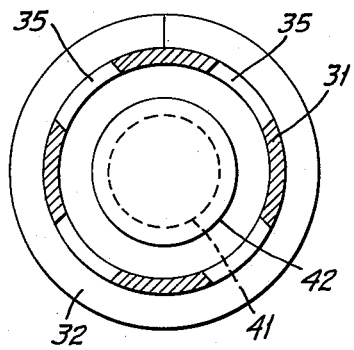
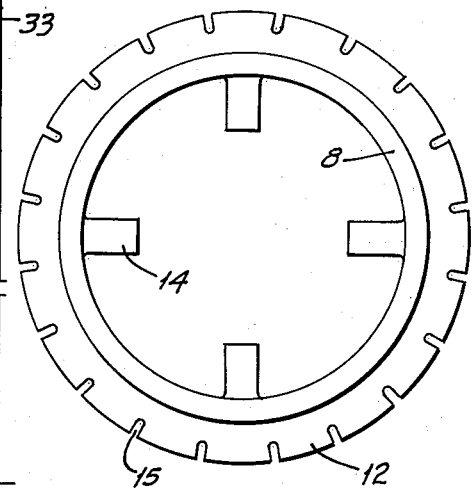
INVENTOR.
William V. Bauer
BY
ATTORNEY Patented Dec. 11, 1951

2,577,729

UNITED STATES PATENT OFFICE 2,577,729

CARBON BISULFIDE RETORT

William V. Bauer, New York, N. Y., assignor to Stauffer Chemical Company, a corporation of California Application May 31, 1950, Serial No. 165,271

3 Claims. (Cl. 23—277)

This invention relates to an improved apparatus or retort useful in the manufacture of carbon bisulfide. Carbon bisulfide is commonly produced by the reaction of carbon and sulfur; the term "carbon" is employed generically herein as referring to any solid carbon source suitable for reaction with sulfur such as charcoal, coke, coal or other carbon, as is mentioned in U. S. Patent 2,036,840, or a specially prepared carbon such as that of U. S. Patent 1,709,611.

The reaction is usually conducted in a vertical tubular shell or retort, the sulfur being introduced as a liquid at the bottom of the shell, while the carbon is fed in at the upper end of the vertical shell at a rate sufficient to maintain the vessel substantially completely filled from the bottom adjacent the sulfur inlet to the top. Periodically, ash is removed through the sulfur inlet at the bottom of the retort. The retort shell is heated by an externally fired furnace to raise the temperature of the carbon and sulfur present in the retort to that temperature whereat carbon bisulfide is formed; an apparatus typical of that employed is shown in United States Patent No. 321,611. Such retorts are subject to numerous failings and objections. For example, the overall thermal efficiency is relatively low inasmuch as the heat input to the carbon mass and the sulfur is through the wall of the retort and the mass of relatively non-conductive carbon filling the retort; the temperature of the furnace must, therefore, be considerably higher than that required for the reaction. As a result, the necessity of utilizing considerable excess fuel is inherent in the operation. The reaction between solid carbon and sulfur is exothermic and in a conventional retort temperatures may be locally present which are several hundred degrees higher than the furnace temperature and which are of the order of 1100° C. For example, localized reaction temperatures of carbon and sulfur of 1110° C. have been measured and which exceeded the furnace temperature by 200° C. At such an elevated temperature, sulfur will attack the metal retort shell much more rapidly than at 800°–900° C., the temperature necessary to initiate the $CS_2$ reaction.

The life of the retort is relatively short, the inorganic salts, ash-forming constituents, carbon and sulfur forming incrustations or clinkers on the metal sidewalls of the retort. The presence of such incrustations or clinkers on the retort wall result in a reduction in the rate of heat transmission through the retort wall and so raise its temperature to one higher than that required for the reaction and whereat the attack on the metal is accelerated; also, they have a deleterious effect on the metal as such, for reasons which are not fully apparent. For these reasons, it is usual to replace present retorts after a period of operation which is so short relatively that the period is measured in months.

Because the conventional furnace is filled with charcoal which is a poor conductor, the rate of heat transfer to the mass of charcoal and to the sulfur passing through the charcoal is relatively poor, with the result that the production rate per unit of retort capacity is relatively low; sulfur traversing the central core of charcoal in the retort may even pass through the retort without ever attaining reaction temperature, merely providing a wasteful load on the carbon bisulfide condensing system. Also, due to the ash and carbon which attach themselves to the retort wall over the life of the retort, the heating rate falls off materially as the retort ages, with an attendant reduction in production of carbon bisulfide.

Heat transfer considerations indicate that the thermal conductivity of sulfur vapor is slightly higher than for most gases at temperatures around its boiling point, then rising sharply as dissociation of the sulfur vapor proceeds to a maximum, finally falling off as dissociation approaches completion. At about 788° C., the conductivity of sulfur vapor is of the same order as that for most gases. However, above this temperature, the conductivity decreases and, at higher temperatures, the conductivity is less than that for most common gases. In heating sulfur vapor in any practical piece of equipment, large temperature differences are experienced. Consequently, even if the main gas temperature is, let us say, 648° C., which would indicate a fairly high sulfur vapor heat conductivity, the temperature of the retort wall may be as high as 815° C., at which temperature the conductivity is quite poor. Under such conditions, one can expect a heat transfer coefficient on the sulfur side of the magnitude of 4 B. t. u. per hour per square foot per °F. I have found that if the sulfur vapor is forced to flow past a heating surface at a relatively high velocity, and under conditions of turbulent flow, then the heat transfer coefficient can be substantially increased and that under such conditions, the coefficient is, in general, proportional to the 0.8 power of the rate of flow. In the case of sulfur vapor at high temperatures, increasing the gas velocity until this is in the region of turbulent flow will result in heat transfer coefficients materially higher than those observed for natural convection; even a moderate increase in sulfur vapor velocity results in heat transfer coefficients three to five times as great as those present under only convection heating.

In accordance with the present invention, there is provided a relatively simple retort for the reaction of solid carbon and sulfur which is effective to heat all the sulfur in the absence of carbon to a uniform temperature for subsequent contact and reaction with carbon in a separate zone in the retort which is isolated from the sulfur heating zone. Such a retort is conveniently provided by a functionally unitary tubular vessel adapted to be positioned vertically in a suitable furnace; means are provided for feeding sulfur as a liquid or vapor at the bottom of the shell and for introducing solid carbon particles into an upper portion of the shell. Intermediate the ends of the shell is provided a support upon which the charge of carbon rests in spaced relation to the lower portion of the shell so that the space below the charge support is free of carbon and serves as a boiler and a superheater for the sulfur. Thus, the support divides the unitary, tubular vessel into two separate functional units, a reaction zone which is filled with carbon and a heating zone wherein the sulfur is heated to reaction temperature, or nearly so. In the sulfur heating zone is provided an auxiliary unit providing a confined path of small cross-section for the sulfur vapor over the heating surface of the retort wall. Thus, instead of the sulfur vapor flowing slowly through the tubular retort to be heated by natural convection, it is forced to travel at a substantially increased velocity to move from one elevation in the retort to another in contact with the retort wall. As a result, the sulfur vapor temperature is brought more nearly to the temperature of the retort wall and with less temperature difference between the two.

If the furnace is so operated as to maintain the retort heating wall surface at a given temperature, the heat transfer to the sulfur vapor will be greatly increased, permitting the same piece of equipment to heat a very much greater quantity of sulfur to the temperature required for the reaction with carbon. Consequently, the productivity of the retort will be increased, without any adverse affect upon the life of the retort. Thus, in addition to a gain in the capacity of an installation of a given size, a further advantage is attained in lower fixed charges per ton of production.

The high velocity of the sulfur vapor around the periphery of the retort tends to produce a more uniform wall temperature around the retort and thus reduce the number and size of hot spots which are difficult to eliminate in conventional equipment. Inasmuch as the life of a retort is determined by the highest temperature on its surface, the reduction or elimination of "hot spots" also extend retort life.

If a retort is operated with high sulfur gas velocities, at throughputs approximating those now utilized in practice, the improvement in the sulfur heat transfer coefficient results in a retort wall temperature which is closer to the sulfur temperature than to the furnace temperature. In other words, the wall temperature is drastically reduced. Inasmuch as the corrosion and deterioration of the retort is critically affected by the temperature of the wall, a very important saving is thus effected in retort cost.

In practice, one may prefer to take advantage of both increased sulfur productivity and lower wall temperature. This can be done by adjusting the furnace temperature so as to attain any desired combination of retort life and unit productivity.

To simplify heat insulation problems, it is preferred that the region wherein the reaction occurs be within the furnace proper, although no heat input is required to the reaction zone; such positioning of the reaction zone is not necessary and the actual reaction zone can be outside the furnace, providing it is suitably heat insulated so that the reaction proceeds without heat loss to the atmosphere, utilization being made of the superheat imparted to the sulfur vapor and of the heat liberated upon the reaction between carbon and the sulfur to increase its reaction rate.

The support means for the carbon charge is such that, when it is desired to clean the reaction space in the shell, the carbon and ash remaining on the support means can be released into the lower region of the retort from which they can be readily removed, usually through the sulfur inlet. Since the carbon charge is relatively small and is of materially reduced extent with respect to the charge present in the usual retort, it should be obvious that the hazard of loss of charcoal is materially reduced as is the time required for cleaning. When the reaction zone is clean, the carbon support is replaced and a fresh carbon charge placed in the reaction zone; usually a frangible carbon support is employed, being broken when it is desired to clean the reaction space and later replaced.

Such a retort as I have broadly described possesses many advantages compared to those which have been heretofore employed or proposed. For example, the sulfur is initially heated by radiation, convection and conduction in an unobstructed and free space defined by a furnace heated wall, and finally by passage at a relatively high velocity over a long path, one side of which is provided by the furnace wall. This heating enables the sulfur temperature to be maintained at a definite level by regulating the furnace temperature. When the sulfur is brought into contact with the carbon, it is at reaction temperature and further heat addition is unnecessary; therefore, the reaction zone can be defined by any one of the materials which are resistant to attack by the reactants. Since heat input to the reaction zone is not necessary, one can use various non-metallic materials which are corrosion-resistant but which are poor heat conductors. In fact, it is preferred to operate the reaction zone without heat loss so insulation of the reaction zone is desirable to ensure that the heat liberated in the reaction is employed to heat the carbon and sulfur and promote the reaction at temperatures of the order of 954° C.

It is in general the broad object of the present invention to provide an improved retort for the manufacture of carbon bisulfide.

Another object of the present invention is to provide an improved carbon bisulfide retort in which the sulfur is separately heated to reaction temperature in the retort under the conditions most favorable to such heating and then passes to the carbon to react therewith.

The invention includes other objects and features of advantage, some of which, together with the foregoing, will appear hereinafter wherein the present preferred form of carbon bisulfide retort of this invention is disclosed.

In the drawing accompanying and forming a part hereof,

Figure 1 is a side elevation partly in section, showing a retort in position in a furnace, the latter being shown schematically to simplify illustration.

Figure 2 is a section taken along line 2—2 of Figure 1 with the frangible disc 42 omitted.

Figure 3 is a plan view of the retort shell.

Referring to the drawing, and particularly to Figures 1 and 2, the installation includes a suitable furnace structure 6 supplied with heat from a suitable source (not shown). Retort 7 is supported in the furnace 6 and comprises a tubular shell 8 having a bottom 9 thereon, the latter usually resting upon the floor of the furnace. The retort is made of any suitable material as cast iron, and is fabricated in any desired manner and of any desired number of parts or sections to provide a functionally unitary shell structure. A sulfur inlet 10 is provided in the lower portion of the shell 8 through which sulfur is admitted and ash is removed periodically; a suitable boot 11 is connected to the sulfur inlet and extends to the outside of the furnace to permit of feeding of sulfur as liquid or vapor and removal of ash and unused carbon from the bottom of the furnace during cleaning of the reaction zone.

The upper portion of the shell 8 includes an annular flange 12 resting upon an upper portion 13 of the furnace structure and supporting an end bell structure 26 in position. The flange 12 includes a plurality of slots 15 (Figure 3) through which bolts (not shown) are passed to secure the end bell on shell 8. A carbon inlet is generally indicated at 27 and is provided on the end bell for feeding of carbon in any desired manner while a carbon-bisulfide vapor outlet 28 is also provided on the end bell for removal of the product. The inlet 27 includes a movable cover generally indicated at 61 and an annular feed member depending in a spaced relation to the end bell.

Intermediate the ends of the shell 8 a plurality of radial extensions 14 extend inwardly of the shell, being spaced about the periphery of the shell. Supported upon the radial extensions 14 is a tubular insert generally indicated at 31 concentrically positioned with respect to the tubular shell 8 and spaced therefrom. Provided about the outer periphery of the tubular insert 31 is a spiral flange 32 which extends upwardly so closely adjacent to the inner heating surface of the tubular shell 8 as to confine the sulfur vapor to travel in the spiral path of small cross section which is provided by the spiral flange and the wall, the flange terminating adjacent the upper end of the tubular insert 31. At its upper end, the tubular insert 31 is provided with an annular flange 33, the latter having an annular opening 34 therein. A plurality of openings 35 are provided in the side wall of the tubular insert to permit sulfur passing about the spiral passageway between the tubular insert 31 and the retort wall to enter and pass upwardly into a carbon charge provided in the reaction space generally indicated at 40. To support the carbon charge in place, a suitable frangible support 37 is provided across the annular opening 34 to permit the sulfur vapor to enter the carbon charge. Such a support is provided by several fire brick positioned across the opening 34 in such a spaced relation to one another as to pass the sulfur vapor freely and yet retain and support the carbon charge for reaction.

The tubular insert also includes an opening 41 in its lower portion and which is closed by a frangible cover plate 42, when it is desired to clean the ash from the reaction zone, both frangible closures 37 and 42 are broken with a poking bar, later being replaced with new frangible closures.

The end bell 26 has heat insulation 52 on its outer surface while its inner surface is lined with insulating brick 53, these being covered with a corrosion and wear-resistant ceramic liner 36 which extends to about the level of the depending annular feed member 61. Carbon bisulfide passes between the lining 53 and the feed member 61 to the outlet 28.

In operation, sulfur is introduced through the sulfur inlet 10, preferably as a vapor, the vapor rising through the lower free space in the retort and being heated to a moderate temperature. Finally the vapor enters the long spiral passageway provided between the insert 31 and the inner surface of the retort wall and wherein, with the furnace operating at a temperature between 800° and 950° C. and with a sulfur feed rate commensurate with the size of the apparatus, it will be found that the sulfur entering the carbon charge is at a reaction temperature, e. g., greater than 750° C. and one whereat the reaction between the carbon and the sulfur goes on exothermically.

It will be observed that the carbon charge support divides the retort shown generally into two zones, a reaction zone and a sulfur heating zone. The reaction zone space can be of relatively small extent since at the higher temperatures achievable through concentration and conservative of exothermic heat of reaction, substantially shorter contact times and higher space velocities are sufficient to obtain the desired percentage conversion. One can feed the carbon continuously or intermittently so long as an adequate charge is present for reaction with the sulfur at any instant. The carbon charge can be maintained in a zone which is external to the sulfur superheating retort.

The sulfur heating zone should be sufficient to supply sulfur vapor at reaction temperature directly to the reaction zone. In any given retort, one can determine, for a given furnace temperature, the maximum permissible sulfur feed rate since if this be exceeded, sulfur appears in an undue quantity in the exit gas and the carbon bisulfide production rate will decrease.

By having the sulfur heating section feeding superheated sulfur directly and immediately to the reaction zone, one avoids any heat loss from the sulfur, as inevitably would occur if superheating and reacting vessels were employed, connected by a conduit. Further, and what is more important, I have found that the superheated sulfur does not give rise to any corrosion problem in the superheating zone in the absence of charcoal or ash. Thus, I am able to employ cast iron retorts successfully to produce more carbon bisulfide per unit of retort volume and, at the same time, increase materially the useful retort life. The sulfur superheating section should have such an area and configuration that, for a given effective furnace temperature, the sulfur is raised to reaction temperature. Thus, if the sulfur be admitted as a vapor at 450° C., then it is necessary to raise it some 300° C. to 750° C.

I claim:

1. Apparatus for the manufacture of carbon bisulfide comprising a furnace; an elongated tubular shell standing vertically in said furnace and having a first inlet for feeding sulfur into a lower portion of the vertical shell and a second inlet for feeding carbon into an upper portion of the vertical shell, and support means extending transversely of the shell and providing a support for carbon fed into the shell through said second inlet, said support means dividing the shell into an upper reaction zone wherein carbon and sulfur react and a lower zone wherein sulfur admitted to the lower portion of the zone is heated to a temperature whereat the sulfur reacts with the carbon to form carbon bisulfide, said support means including an apertured portion and a removable closure therefor adapted to be removed to permit ash and carbon on said support means to be discharged into the sulfur heating zone for removal from the tubular shell; a tubular insert in an upper portion of said lower zone concentric with and spaced from the adjacent portion of said tubular shell and having a spiral fin provided about its periphery adjacent to said tubular shell to provide a confined spiral passage therewith wherein sulfur vapor moves at an increased velocity as compared to the lower portion of said lower zone; an outlet from said shell for products of reaction, said outlet being from said upper reaction zone and communicating with the upper portion of said shell above said support means; said shell being positioned in said furnace with at least that portion of the shell defining the sulfur heating zone confined within and receiving heat from the furnace.

2. Apparatus for the manufacture of carbon bisulfide comprising a furnace; an elongated tubular shell standing vertically in said furnace and having a first inlet for feeding sulfur into a lower portion of the vertical shell and a second inlet for feeding carbon into an upper portion of the vertical shell; a tubular insert in an upper portion of said lower zone concentric with and spaced from the adjacent portion of said tubular shell and having a spiral fin provided about its periphery adjacent to said tubular shell to provide a confined spiral passage therewith wherein sulfur vapor moves at an increased velocity as compared to the lower portion of said lower zone; said tubular insert including an apertured portion at its upper end, support means extending transversely of the shell across said apertured portion and providing a support for carbon fed into the shell through said second inlet, said support means dividing the shell into an upper reaction zone wherein carbon and sulfur react and a lower zone wherein sulfur admitted to the lower portion of the zone is heated to a temperature whereat the sulfur reacts with the carbon to form carbon bisulfide, said support means being removable to permit ash and carbon thereon to be discharged into the sulfur heating zone for removal; an outlet from said shell for products of reaction, said outlet being from said upper reaction zone and communicating with the upper portion of said shell above said support means; said shell being positioned in said furnace with at least that portion of the shell defining the sulfur heating zone confined within and receiving heat from the furnace.

3. Apparatus for the manufacture of carbon bisulfide comprising a furnace; an elongated tubular shell standing vertically in said furnace; a tubular insert concentrically disposed in said shell and having a circumferential flange at the top thereof, carbon support means including a grate resting on said flange and extending transversely of said shell and dividing the shell into a lower sulfur heating zone and an upper carbon-sulfur reaction zone, said shell having a first inlet for feeding sulfur into the sulfur heating zone and a second inlet for feeding carbon into the carbon-sulfur reaction zone, said tubular insert having a spiral fin extending upwardly about the outer periphery of the tubular insert and fitting said shell to provide therewith a spiral passageway between the furnace wall and the outer wall of the tubular insert thus to permit sulfur flow over at least a portion of the wall of said tubular shell in the upper portion of said sulfur heating zone to provide a confined passage wherein sulfur vapor moves at an increased velocity as compared to the lower portion of said lower zone; an outlet from said shell for products of reaction, said outlet being from said reaction zone and communicating with the upper portion of said shell above said spiral passageway; said shell being positioned in said furnace with at least that portion of the shell defining the sulfur heating zone confined within and receiving heat from the furnace.

WILLIAM V. BAUER.

REFERENCES CITED

The following references are of record in the file of this patent:

UNITED STATES PATENTS

| Number | Name | Date |
|---|---|---|
| 321,661 | Taylor | July 7, 1885 |
| 1,218,588 | Barnett et al. | Mar. 6, 1917 |
| 1,705,614 | Griswold | Mar. 19, 1929 |
| 1,904,513 | Norlander | Apr. 18, 1933 |